United States Patent
Li et al.

(10) Patent No.: US 11,595,783 B2
(45) Date of Patent: Feb. 28, 2023

(54) EFFICIENT SECURE PHASE-BASED RANGING USING LOOPBACK CALIBRATION

(71) Applicant: Cypress Semiconductor Corporation, San Jose, CA (US)

(72) Inventors: Yan Li, Morganville, NJ (US); Jie Lai, Belle Mead, NJ (US); Pouria Zand, Irvine, CA (US); Kiran Uln, Pleasanton, CA (US); Victor Simileysky, San Jose, CA (US)

(73) Assignee: Cypress Semiconductor Corporation, San Jose, CA (US)

( * ) Notice: Subject to any disclaimer, the term of this patent is extended or adjusted under 35 U.S.C. 154(b) by 86 days.

(21) Appl. No.: 17/341,226

(22) Filed: Jun. 7, 2021

(65) Prior Publication Data

US 2022/0394424 A1    Dec. 8, 2022

(51) Int. Cl.
    *H04W 24/00*    (2009.01)
    *H04W 4/02*    (2018.01)
    *G01S 13/84*    (2006.01)

(52) U.S. Cl.
    CPC ............. *H04W 4/023* (2013.01); *G01S 13/84* (2013.01)

(58) Field of Classification Search
    CPC ............................... H04W 4/023; G01S 13/84
    See application file for complete search history.

(56) References Cited

U.S. PATENT DOCUMENTS 10,986,467 B1 *   4/2021   Bloechl ................ H04W 4/029
2020/0209340 A1 *   7/2020   Ylamurto ............ H04W 56/004

OTHER PUBLICATIONS

H. Olafsdottir, et al., "On the Security of Carrier Phase-based Ranging", Cornell University, Cryptography and Security, Oct. 19, 2016; 21 pages.

* cited by examiner

*Primary Examiner* — Erika A Washington

(57) ABSTRACT

A system and method for an efficient secure phase-based ranging using loopback calibration, including receiving, by a reflector during a current timeslot, an incoming constant tone (CT) signal having a phase shift; determining, by the reflector during the current timeslot or a previous timeslot, a phase shift correction value by using a receiver/transmitter (Rx/Tx) loopback path of the reflector; and/or generating, by the reflector, an outgoing CT signal having an updated phase shift by adjusting the phase shift of the incoming CT signal based on the phase shift correction value.

20 Claims, 13 Drawing Sheets

1200

Receiving, by a reflector during a current timeslot, an incoming constant tone (CT) signal having a phase shift
1202

Determining, by the reflector during the current timeslot or a previous timeslot, a phase shift correction value by using a receiver/transmitter (Rx/Tx) loopback path of the reflector
1204

Generating, by the reflector, an outgoing CT signal having an updated phase shift by adjusting the phase shift of the incoming CT signal based on the phase shift correction value
1206

EFFICIENT SECURE PHASE-BASED RANGING USING LOOPBACK CALIBRATION

TECHNICAL FIELD

The present disclosure relates generally to wireless telecommunications, and more particularly, to an efficient secure phase-based ranging using loopback calibration.

BACKGROUND

Narrow-band radios such as Bluetooth Low Energy (LE) or IEEE 802.15.4 radios may determine the distance between devices within sub-meter accuracy. One of the solutions to provide an accurate distance measurement is multi-carrier phase-based ranging, in which the two-way phase-difference between two devices is measured over multi-carriers.

BRIEF DESCRIPTION OF THE DRAWINGS

The present disclosure is illustrated by way of example, and not by way of limitation, in the figures of the accompanying drawings in which like reference numerals refer to similar elements and in which:

FIG. 12 is a flow diagram of a method of an efficient secure phase-based ranging using loopback calibration, according to some embodiments.

DETAILED DESCRIPTION

Figure 1:
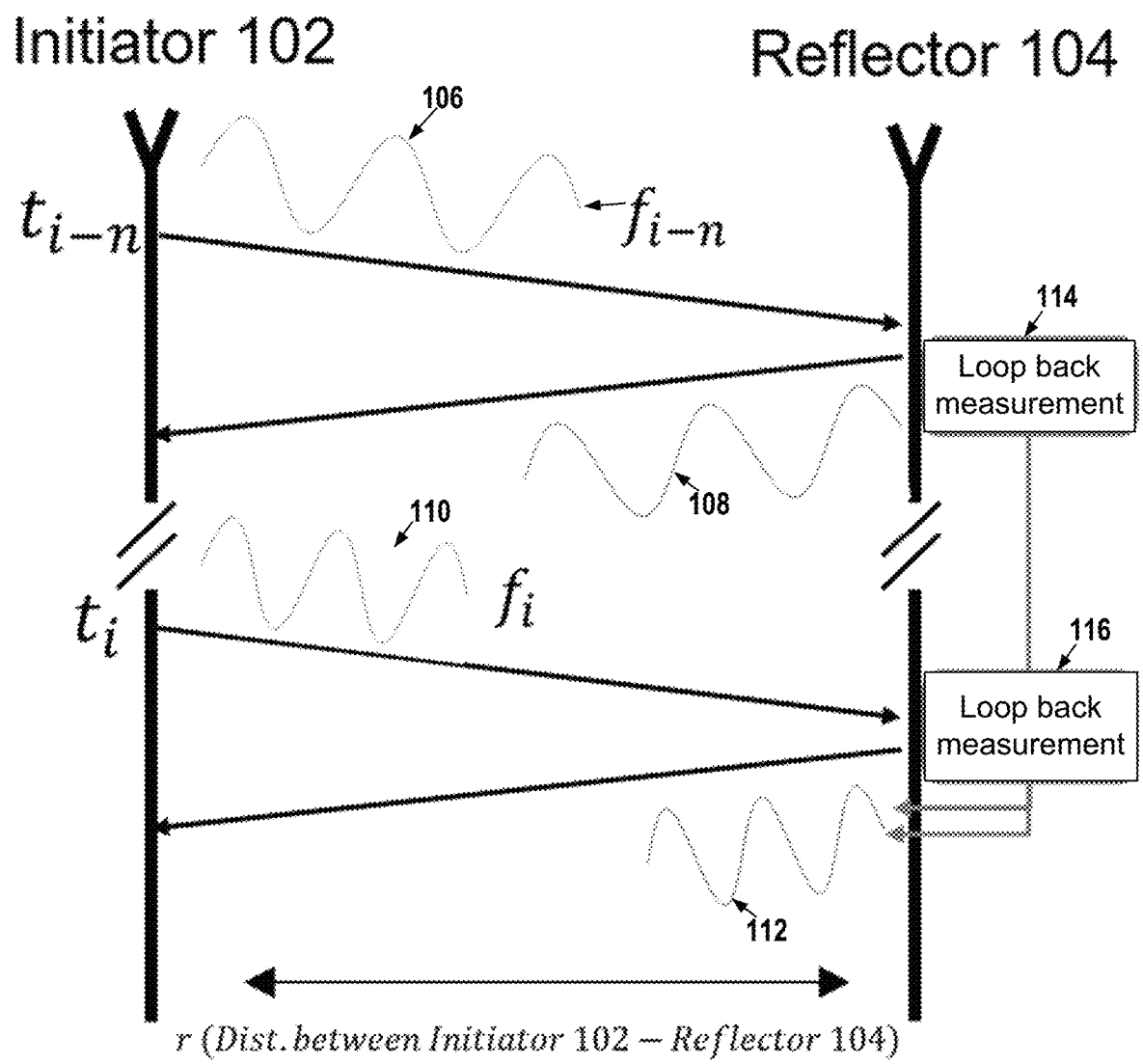
FIG. 1 is a timing diagram illustrating an example of a message sequence for inline phase transfer in which an initiator and a reflector exchange one or more constant tones (CTs) during timeslots and at different frequencies, according to some embodiments.

The following description sets forth numerous specific details such as examples of specific systems, components, methods, and so forth, in order to provide a good understanding of various embodiments of the techniques described herein for an efficient secure phase-based ranging using loopback calibration. It will be apparent to one skilled in the art, however, that at least some embodiments may be practiced without these specific details. In other instances, well-known components, elements, or methods are not described in detail or are presented in a simple block diagram format in order to avoid unnecessarily obscuring the techniques described herein. Thus, the specific details set forth hereinafter are merely exemplary. Particular implementations may vary from these exemplary details and still be contemplated to be within the scope of the present disclosure.

In the phase-based ranging, two devices (sometimes referred to as, "the initiator" and "the reflector") exchange multiple Constant Tones (CT) over different channels to mitigate multi-path fading and/or radio frequency (RF) interference. In some applications, for instance in Passive Entry Passive Start (PEPS) applications, the positioning services may need to be secure against man-in-the-middle attacks (e.g., when an attacker intercepts communications between two parties to secretly eavesdrop and/or modify traffic traveling between the two), phase manipulation attacks, phase-slope rollover attacks (e.g., when the attacker delays the signals with a fixed time delay such that the measured phase difference between the signals reaches its maximum value of $2\pi$ and rollover), and/or Early Detect Late Commit (EDLC) attacks (e.g., when the attacker learns the symbol polarity early and commits to the polarity late in order to cause an early signal Time-of-Arrival (ToA) at the receivers).

The Round-Trip Time (RTT) between two devices may be used to protect the phase-based ranging against a roll-over attack and/or phase manipulation attacks, where RTT is the length of time that it takes for a data packet (e.g., data frame, signal) to be sent to a second device (e.g., the destination) plus the time that it takes for an acknowledgement of that packet to be received back at the first device (e.g., the origin). In some instances, using RTT to protect against such attacks may mean that the distance between two devices is determined (e.g., measured, calculated) using the phase-based ranging solution and the RTT solution, and if the difference between these two solutions is less than a threshold (e.g., three meters), then the phase-based ranging result may be deemed secure.

In a multi-carrier phase-based system, two devices (an initiator and a reflector) may perform a ranging procedure, where the initiator is the device that initiates (e.g., starts, begins, triggers) the ranging procedure and the reflector is the device that responds to the initiator. The two devices may perform a handshaking, by which they agree on the ranging parameters, such as the channels and/or the time to start the ranging process. Then, the initiator may send a continuous wave (CW) and/or a CT carrier signal toward the reflector. In some embodiments, the CT may include an RTT packet or may send the CT along with the RTT packet. In some embodiments, the initiator may send the CT signal before sending the RTT packet or may send the CT after sending the RTT packet. Upon reception of the signal by the reflector, the reflector may lock the phase and/or frequency of its local oscillator to the received signal. The reflector may perform (e.g., execute) the phase and/or frequency measurement. The reflector may transmit the phase and/or frequency measurement back toward the initiator.

At the same time, the initiator may change direction and become the receiver (i.e., change roles). The initiator may receive the reflector's CW and/or CT, and perform the phase measurement. The reflector phase measurement results (sometimes referred to as, "phase reports"), which correspond to correction terms, may be sent toward the initiator by which the initiator can use to estimate the distance. The distance between the initiator and the reflector may be proportional to the delta phase of the received signal and the reflector reference signal.

In an RTT based system, the initiator transmits an RTT packet that is received by the reflector. Upon reception of the RTT packet, the reflector estimates the ToA. Afterward, the reflector sends its response packets and records the transmitted signal delay (ToD). The initiator, upon reception of the responding packet, estimates the ToA. At the end of this process, the reflector needs to send its timing reports/measurements (sometimes referred to as, "ToD-ToA") toward the initiator to estimate the final RTT distance.

As discussed herein, the multi-carrier phase-based ranging and the RTT may require the reflector to report the phase and/or timing correction terms to the initiator. This reporting, which may start at the end of the secure phase-based ranging procedure, may produce a reporting communication overhead that takes time (i.e., adds delay to the communication between the devices) and/or consumes excessive resources (e.g., power, networking bandwidth). In addition, in some applications, the multi-carrier phase-based ranging and the RTT may need to be performed in a connectionless mode, in which exchanging the phase and/or time report may be challenging.

The conventional system attempts to address the described problems (e.g., reporting communication overhead) by using an inline phase transfer for a multi-carrier phase-based system and an inline time transfer for an RTT based system, where the reflector is configured to adjust the phase and/or time of the outgoing transmission (e.g., an RTT packet and/or CT) toward the initiator for the purpose of including a measurement result (e.g., performed by the reflector) in the outgoing transmission. In addition, the inline phase transfer and/or inline time transfer may allow the initiator to make an intermediate distance estimation using the intermediate measurements (e.g., phase reports and/or timing reports sent from the reflector to the initiator) for an existing timeslot, during which the outgoing transmission (e.g., RTT packets and/or CTs) is received. As such, the ranging algorithm may not have to wait to finish the entire procedure and/or to receive the entire reports before the initiator receives any of the measurement results.

However, there are drawbacks with the conventional system in that the reflector in the conventional system must share at least some portion of its measurement report (e.g., phase reports, timing reports) with the initiator in order for the initiator to determine a distance to the reflector based on the measurement report. To share some or all of the measurement reports, the reflector often must direct several transmissions towards the initiator, which may result in excessive power consumption and/or increases in network congestion.

Aspects of the disclosure address the above-noted and other deficiencies by providing an efficient secure phase-based ranging that uses loopback calibration and/or measurements. In various embodiments, as described in the below passages, a computing device (e.g., an initiator) using the phase-based ranging technique of the present disclosure may determine (e.g., measure, calculate, estimate) the internal delay variation and/or phase rotation along transmitter (Tx) and/or receiver (Rx) paths using a loopback path, and/or adjust the transmitted signal delay (sometimes referred to as, "inline time" or "time delay") and/or phase (sometimes referred to as, "inline phase") of its one or more outgoing transmissions (e.g., RTT packets and/or CT signals) based on the loopback measurements.

By using the phase-based ranging technique of the present disclosure, the phase reports and/or timing measurements (e.g., ToD-ToA) may become constant (e.g., fixed); thereby mitigating or eliminating the need for the reflector to send the phase reports and/or timing reports (e.g., ToD-ToA) at the end of the inline time transfer and/or inline phase transfer. As such, the phase-based ranging technique of the present disclosure may decrease networking latency because the reflector does not have to wait until the end of the inline time transfer and/or inline phase transfer to receive the phase reports and/or timing reports. Furthermore, the phase-based ranging technique of the present disclosure may decrease network congestion and power consumption because the reflector can send fewer messages and/or reports to the initiator.

1. Inline Phase Transfer Using Loopback Measurements

An initiator (e.g., initiator 102 in FIG. 1) may have an improved accuracy in measuring distance to a reflector (e.g., reflector 104 in FIG. 1) when the initiator 102 and/or the reflector 104 perform an inline phase transfer using loopback measurements. By performing an inline phase transfer using loopback measurements, the initiator and/or reflector may be able to omit (e.g., skip, eliminate) the operation/step of sharing their respective secure phase measurement results (e.g., phase reports, timing reports) with one another; thereby resulting in less transmissions between the computing devices, which in turn, reduces power consumption and/or network congestion.

In inline phase transfer using loopback phase measurement, a reflector (e.g., reflector 104 in FIG. 1) may be configured to adjust (e.g., modify, change, regulate) the phase of an outgoing CT signal (sometimes referred to as, "an outgoing transmission") based on the phase (as measured at the antenna) of an incoming CT signal (sometimes referred to as, "an incoming transmission") from an initiator and/or the internal Tx-Rx path phase rotation. In some embodiments, a phase rotation may refer to the order in which the voltage waveforms of a polyphase alternating current (AC) source reach their respective peaks. In some embodiments, the reflector may measure (e.g., determine, calculate, estimate) the internal Tx-Rx path phase rotation using the loopback method (sometimes referred to as, "loopback measurement"). In some embodiments, the reflector adjusts a phase of a tone generator (e.g., tone generator 1014 in FIG. 10) based on the measured phase rotation (from a previous timeslot or current timeslot).

FIG. 1 is a timing diagram illustrating an example of a message sequence for inline phase transfer in which an initiator and a reflector exchange one or more CTs during timeslots and at different frequencies, according to some embodiments. The timing diagram 100 includes a computing device (shown in FIG. 1 as, "initiator 102") that is in communication with another computing device (shown in FIG. 1 as, "reflector 104") via one or more communication standards (e.g., cellular, Bluetooth, Zigbee, Wi-Fi, etc.), where the initiator 102 and the reflector 104 are spaced apart from one another by a distance of r (e.g., up to 30 feet for Bluetooth, up to 160 feet for Wi-Fi, up to 50 miles for cellular).

In some embodiments, a computing device may be any suitable type of computing device or machine that has a processing device (e.g., one or more processors), for example, a mobile device, a mobile phone, a smart device, a computer, a server, a network device, a tablet, a smart watch, an Internet of Things (IoT) device, etc.

The timing diagram 100 shows that the reflector 104 may be configured to receive an incoming CT signal 106 on frequency $f_{i-n}$ from the initiator 102 during a first time slot (sometimes referred to as, "previous timeslot $t_{i-n}$"). The reflector 104 may be configured to send an outgoing CT 108 on frequency $t_{i-n}$ to the initiator 102 during the first time slot (e.g., previous timeslot $t_{i-n}$). In some embodiments, frequency $f_i$ and frequency $f_{i-n}$ are different frequencies. In some embodiments, the previous timeslot $t_{i-n}$ may correspond to the timeslot that immediately precedes the current timeslot $t_i$. In some embodiments, the previous timeslot $t_{i-n}$ may correspond to any timeslot that precedes the current timeslot $t_i$. For example, the current timeslot $t_i$ may be timeslot [10], and the previous timeslot $t_{i-n}$ may be any of timeslots [1]-[9].

The timing diagram 100 shows that the reflector 104 may be configured to receive an incoming CT signal 110 on frequency $f_i$ from the initiator 102 during a second time slot (sometimes referred to as, "current timeslot $t_i$"). The reflector 102 may be configured to send (e.g., transmit, provide, forward) an outgoing CT signal 112 on frequency $f_i$ to the initiator 102 during the second time slot (e.g., current timeslot $t_i$).

The reflector 104 may be configured to adjust, in response to receiving an incoming CT signal (e.g., incoming signal CT 106, incoming CT signal 110), the phase of its outgoing CT signal (e.g., outgoing CT signal 108, outgoing CT signal 112) based on a loopback measurement (e.g., an internal Tx-Rx path phase rotation and/or frequency). In some embodiments, the reflector 104 may be configured to measure (e.g., determine, calculate, estimate) a loopback measurement 114 during the previous timeslot $t_{i-n}$ based on the incoming CT signal 106, where i is defined as the timeslot number and n is defined as 0<n<i. In some embodiments, the reflector 104 may be configured to perform a loopback measurement 116 during the current timeslot $t_i$ based on the incoming CT signal 110.

1.1 Pre-Rotation During Estimation

Figure 2:
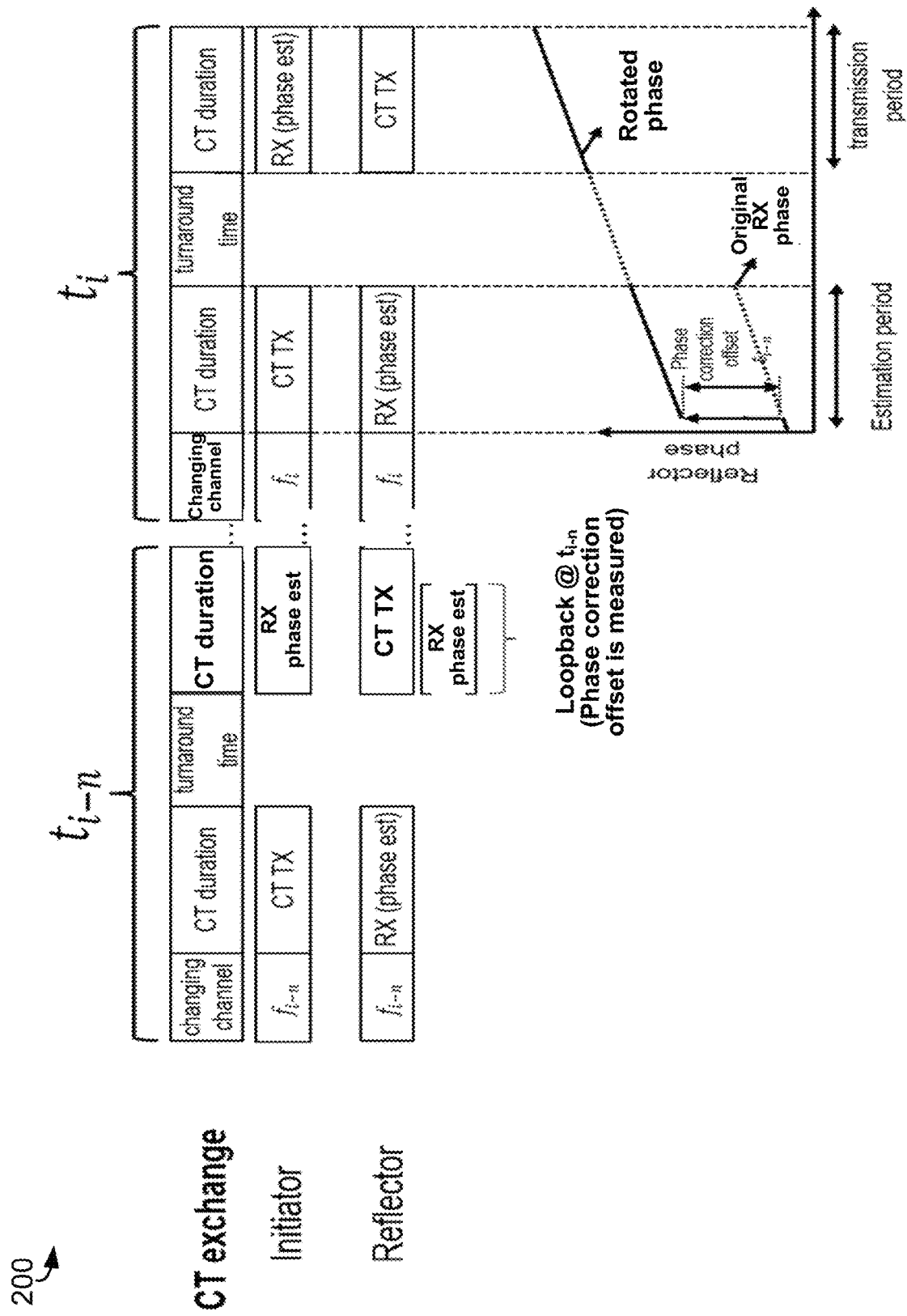
FIG. 2 illustrates a timing diagram of an example inline phase transfer for pre-rotation during estimation, according to some embodiments.

FIG. 2 illustrates a timing diagram of an example inline phase transfer for pre-rotation during estimation, according to some embodiments. The timing diagram 200 shows the exchange of CT signals between an initiator 102 and reflector 104 during a previous timeslot $t_{i-n}$ and a current timeslot $t_i$, and the corresponding changing channel, CT duration, and turnaround time.

In some embodiments, the reflector 104 may be configured to rotate, at the current timeslot $t_i$ during the estimation period, the phase of the incoming CT signal 106 based on the phase correction offset (sometimes referred to as, "a phase shift correction") to generate a new rotated phase. In some embodiments, the phase correction offset may be a loopback measurement (e.g., an internal Tx-Rx path phase rotation and/or frequency) that the reflector 104 measures based on the incoming CT signal 106 during any of the previous timeslots $t_{i-n}$ (e.g., historical timeslots). In some embodiments, the reflector 104 may be configured to convert (e.g., transform, normalize) one or more of the loopback measurements from timeslot $t_{i-n}$ to timeslot $t_i$.

In some embodiments, the reflector 104 may be configured to perform (e.g., execute, implement) the phase-frequency measurement. In some embodiments, the reflector 104 may be configured to lock (e.g., maintain, hold, keep) a phase of its tone generator by the new rotated phase. In some embodiments, a tone generator may be a digital phased lock loop (DPLL)

In some embodiments, the reflector 104 may be configured to transmit, at current timeslot $t_i$ during the CT transmission period (as shown in FIG. 2), the CT outgoing signal using its own tone generator toward the initiator 102. In some embodiments, the phase of the tone generator is continuing (e.g., maintaining) the phase that it locks at the estimation period.

Figure 3:
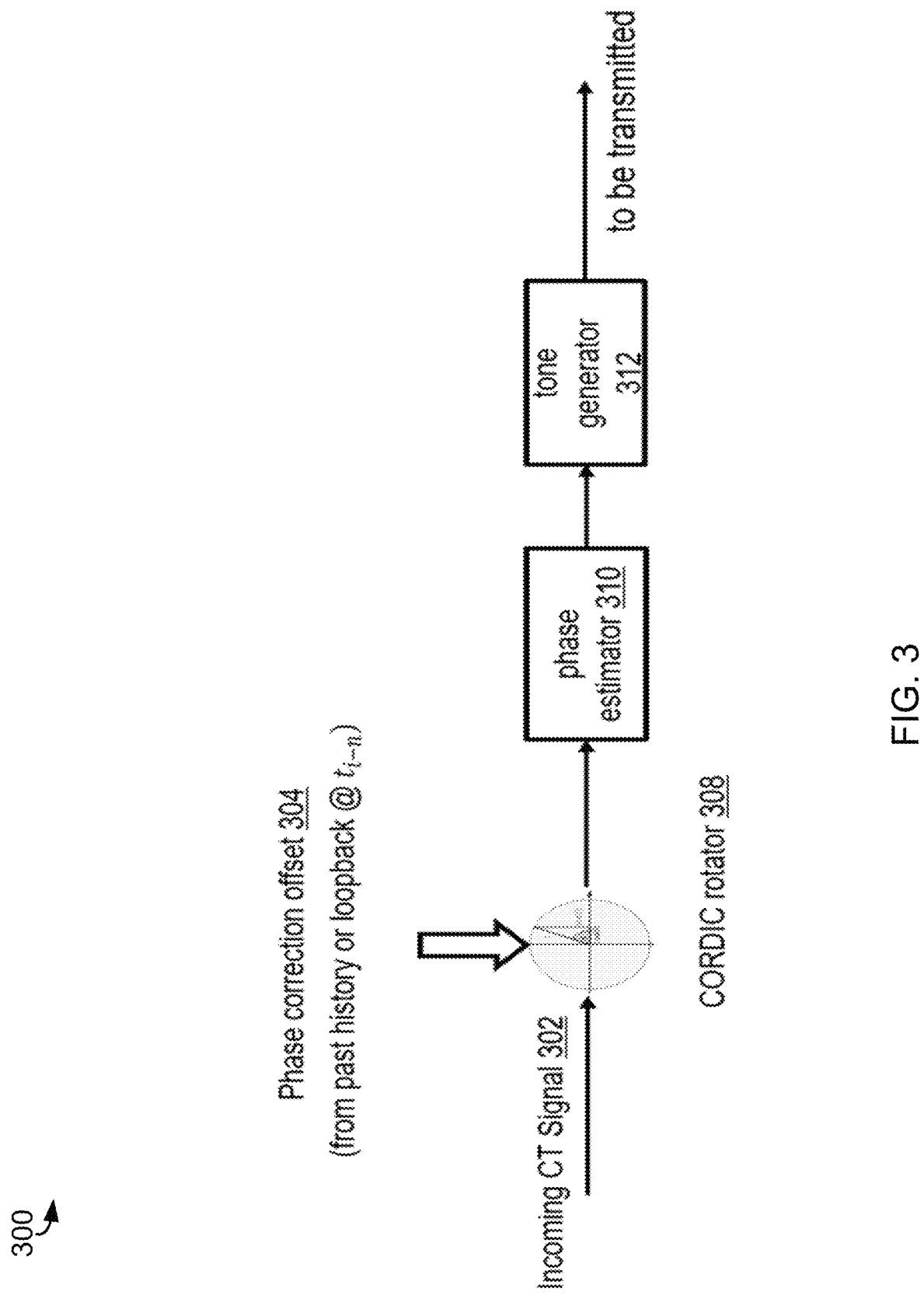
FIG. 3 illustrates a block diagram of an example inline phase transfer for pre-rotation during estimation, according to some embodiments.

FIG. 3 illustrates a block diagram of an example inline phase transfer for pre-rotation during estimation, according to some embodiments. As shown, the block diagram 300 includes a coordinate rotation digital computer (CORDIC) rotator 308, a phase estimator 310, and a tone generator 312. An input terminal of the CORDIC rotator 308 is coupled to an antenna (not shown in FIG. 3) of the reflector 104. An output terminal of the CORDIC rotator 308 is coupled to an input terminal of the phase estimator 310, whose output terminal is coupled to an input terminal of a tone generator 312. An output terminal of the tone generator 312 is coupled to a transmitter (not shown in FIG. 3) of the reflector 104.

In some embodiments, the reflector 104 may be configured to use the CORDIC rotator 308 to perform a loopback measurement (e.g., loopback measurement 114 in FIG. 1, loopback measurement 116 in FIG. 1). In some embodiments, the reflector 104 may be configured to generate a new rotated phase by using the CORDIC rotator 308 to rotate the phase of an incoming CT signal 302 (e.g., incoming CT signal 106 in FIG. 1, incoming CT signal 110 in FIG. 1) based on a phase correction offset 304. In some embodiments, the incoming CT signal 302 may be a receiver constant tone. In some embodiments, the reflector 104 may be configured to receive the incoming CT signal 302 at one or more antennas of the reflector 104. In some embodiments, the phase correction offset 304 may be a phase correction offset 304 that the reflector 104 measured based on an incoming CT signal 302 from any of the previous timeslots $t_{i-n}$ (e.g., historical timeslots) with respect to the current timeslot $t_i$.

In some embodiments, the reflector 104 may be configured to perform a loopback measurement (e.g., phase and/or frequency). In some embodiments, the phase correction offset 304 may be the internal Tx-Rx path phase rotation that the reflector 104 measured by loopback based on an incoming CT signal from any of the previous timeslots $t_{i-n}$. In some embodiments, the tone generator 312 may be configured to lock based on the output (e.g., the new rotated phase) of the CORDIC rotator 308.

1.2 Post-Rotation During Generation

Figure 4:
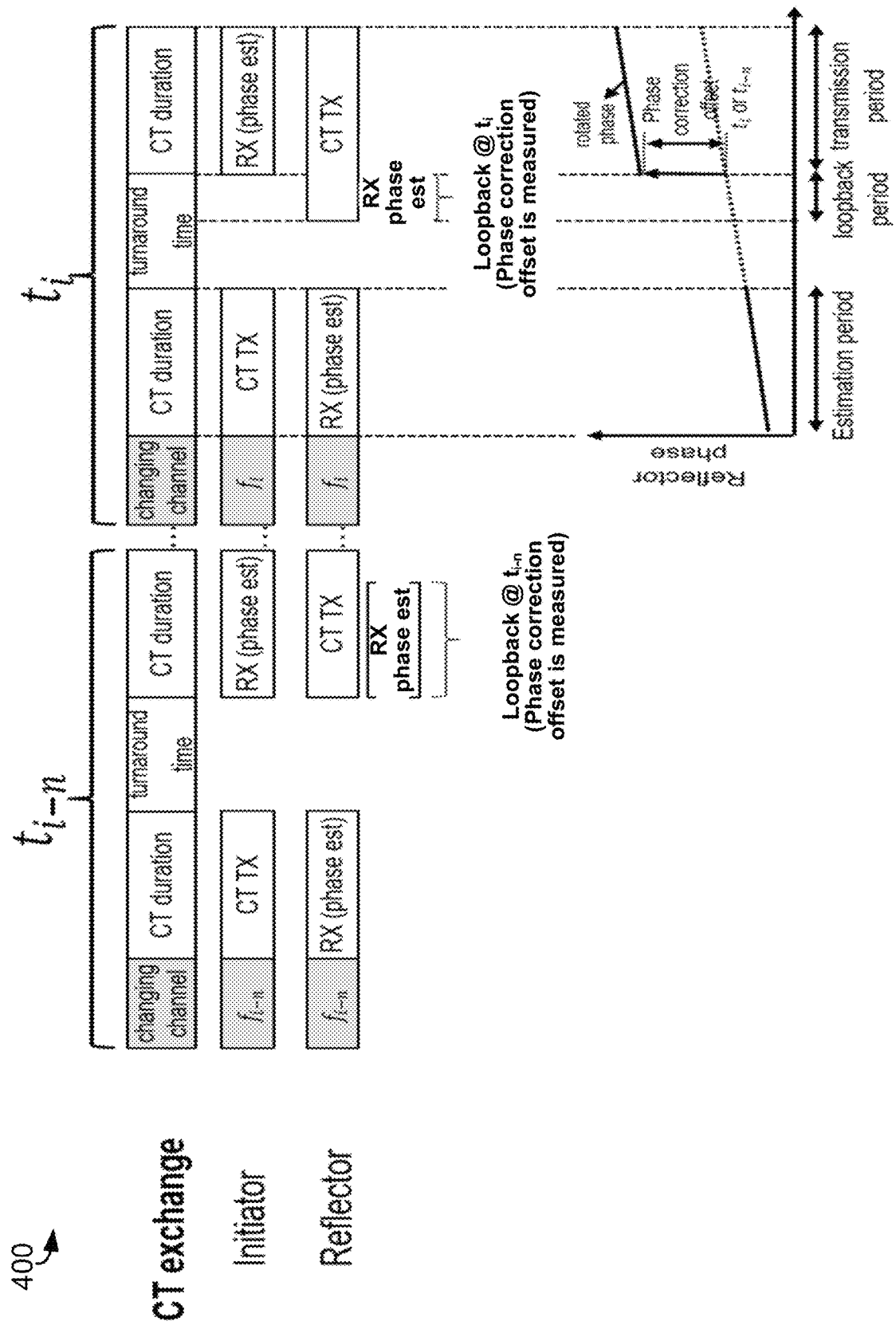
FIG. 4 illustrates a timing diagram of an example inline phase transfer for post-rotation during generation, according to some embodiments.

FIG. 4 illustrates a timing diagram of an example inline phase transfer for post-rotation during generation, according to some embodiments. The timing diagram 400 shows the exchange of CT signals between an initiator 102 and reflector 104 during a previous timeslot $t_{i-n}$ and a current timeslot $t_i$, and the corresponding changing channel, CT duration, and turnaround time.

In some embodiments, the reflector 104 may be configured to perform, at the current timeslot $t_i$ during the estimation period, the loopback measurement (phase and/or frequency) of the incoming CT signal 106 and/or lock a phase of its tone generator to the measured phase from the incoming CT signal. In some embodiments, the reflector 104 may be configured to rotate at the current timeslot $t_i$ during the estimation period and responsive to locking the phase of its tone generator, the phase of its tone generator based on a desired phase correction offset (e.g., an internal Tx-Rx path phase rotation measured by loopback based on an incoming CT signal from the current timeslot $t_i$) to generate a new rotated phase. In some embodiments, the phase of the tone generator is continuing (e.g., maintaining) the phase that it locks at the estimation period. In some embodiments, the reflector 104 may be configured to transmit, at current timeslot $t_i$ during the CT transmission period (as shown in FIG. 2), the CT outgoing signal using its own tone generator toward the initiator 102.

In some embodiments, the reflector 104 may be configured to measure the desired phase correction offset by loopback based on an incoming CT signal from any of the previous timeslots $t_{i-n}$ (e.g., historical timeslots) with respect to the current timeslot $t_i$. In some embodiments, the reflector 104 may be configured to convert, before the transmission period, one or more of the loopback phase measurements from timeslot to timeslot $t_i$.

Figure 5:
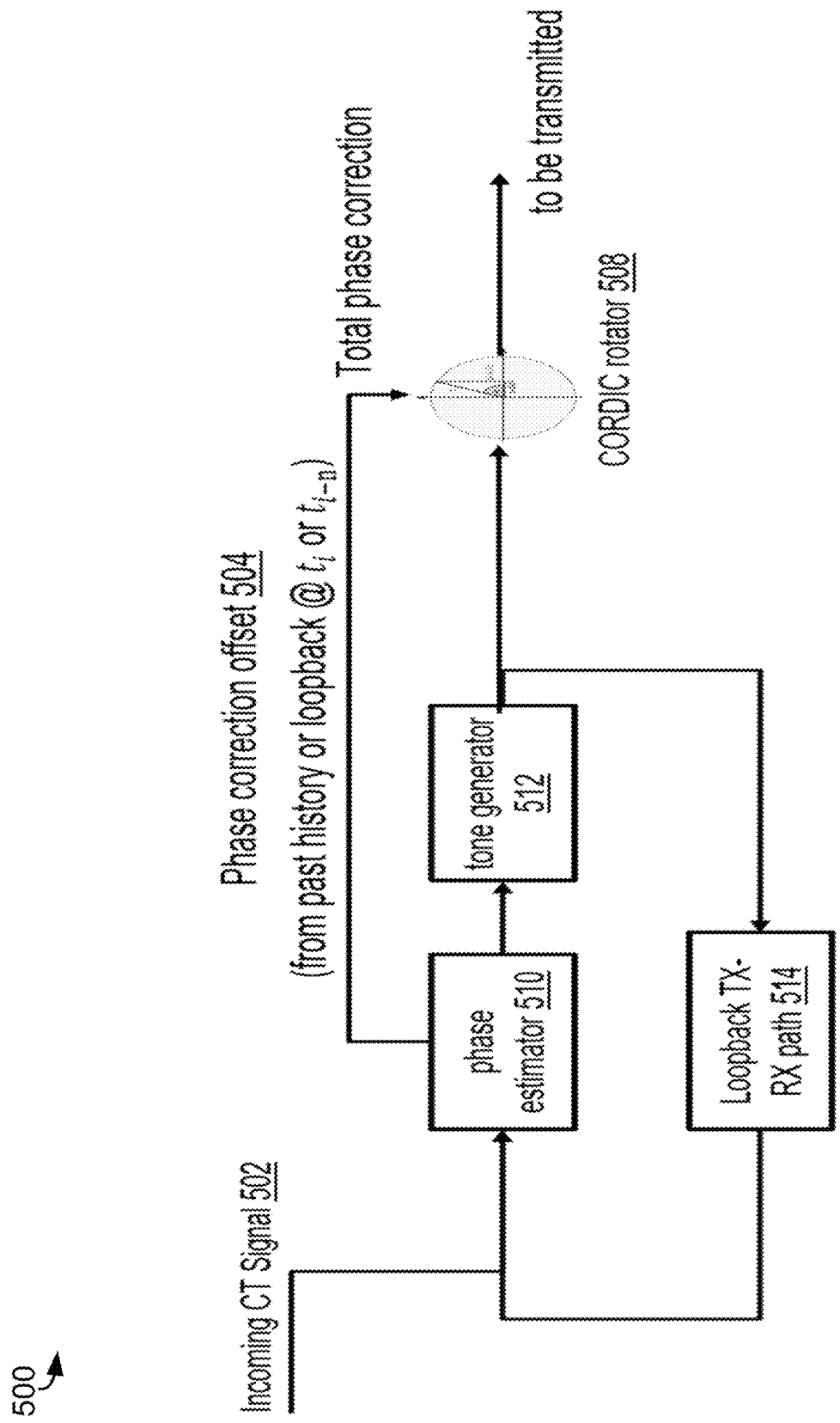
FIG. 5 illustrates a block diagram of an example inline phase transfer for post-rotation during generation, according to some embodiments.

FIG. 5 illustrates a block diagram of an example inline phase transfer for post-rotation during generation, according to some embodiments. As shown, the block diagram 500 includes a CORDIC rotator 508, a phase estimator 510, a tone generator 512, and a loopback Tx-Rx path 514. An input terminal of the phase estimator 510 is coupled to an antenna (not shown in FIG. 5) of the reflector 104. A first output terminal of the phase estimator 510 is coupled a first input terminal of the CORDIC rotator 508 and a second output terminal of the phase estimator 510 is coupled to an input terminal of the tone generator 512.

An input terminal of the loopback Tx-Rx path 514 is coupled to the antenna of the reflector 104 and an output terminal of the loopback Tx-Rx path 514 is coupled to the output terminal of the tone generator 512 and a second input terminal of the CORDIC rotator 508, whose output terminal is coupled to a transmitter (not shown in FIG. 5) of the reflector 104.

In some embodiments, the reflector 104 may be configured to perform a loopback measurement (e.g., loopback measurement 114 in FIG. 1, loopback measurement 116 in FIG. 1) during the estimation period to measure phase and/or frequency of an incoming CT signal 502, and/or lock a phase of its tone generator to the measured phase from the incoming CT signal. The reflector 104 may be configured to enable, during the loopback period and/or in response to locking the phase of its tone generator, the loopback operation to measure the internal Tx-Rx path phase rotation (e.g., phase correction offset 504). The reflector 104 may be configured to use the CORDIC rotator 308 to rotate the phase of the tone generator based on the desired offset (e.g., phase correction offset 504) to generate a new rotated phase. In some embodiments, the reflector 104 may be configured to transmit the new rotated phase during the tone transmission period.

Figure 6:
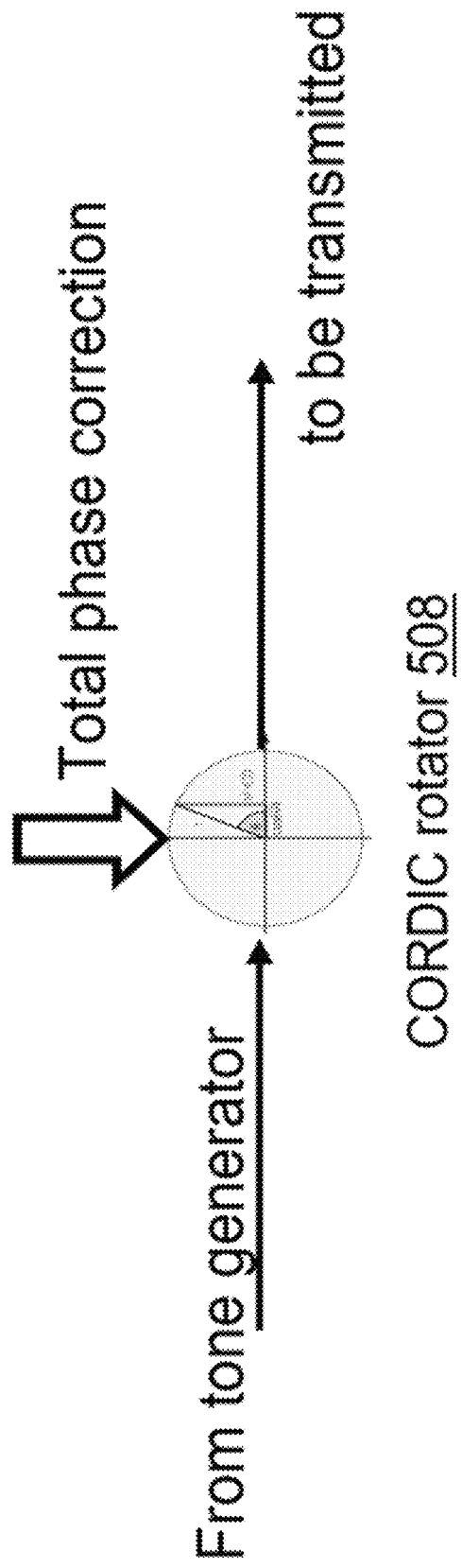
FIG. 6 illustrates a block diagram of an example inline phase transfer for post-rotation during generation, according to some embodiments.

FIG. 6 illustrates a block diagram of an example inline phase transfer for post-rotation during generation, according to some embodiments. As shown, the block diagram 600 includes the CORDIC rotator 508 from FIG. 5. The reflector 104 may be configured to use the CORDIC rotator 508 to rotate the phase of the tone generator 512 from FIG. 5 based on the desired offset (e.g., phase correction offset 504) to generate a new rotated phase.

In some embodiments, the desired phase correction offset (e.g., phase correction offset 504) may be the internal Rx-Tx path phase rotations that the reflector measures by loopback based on an incoming CT signal from the current timeslot $t_i$ or any of the previous timeslots $t_{i-n}$ (e.g., historical timeslots) with respect to the current timeslot $t_i$. In some embodiments, the reflector 104 may be configured to convert one or more of the loopback phase measurements from timeslot $t_{i-n}$ to timeslot $t_i$. In some embodiments, the reflector 104 may be configured to transmit the new rotated phase during the tone transmission period.

2. Inline Time Transfer Using Loopback Measurements

An initiator (e.g., initiator 102 in FIG. 1) may have an improved accuracy in measuring distance to a reflector (e.g., reflector 104 in FIG. 1) when the initiator 102 and/or the reflector 104 perform an inline time transfer using loopback measurements. By performing an inline time transfer using loopback measurements, the initiator and/or reflector may be able to omit (e.g., skip, eliminate) the operation/step of sharing their respective secure phase measurement results (e.g., timing reports) with one another; thereby resulting in less transmissions between the computing devices, which in turn, reduces power consumption and/or network congestion.

In inline time transfer using loopback measurements, a reflector (e.g., reflector 104 in FIG. 1) may be configured to adjust a transmitted signal delay (aka. Time-of-Departure, ToD) of an outgoing RTT packet to an initiator 102 based on the measured fractional Time-of-Arrival (ToA) and/or internal Tx-Rx path delay variation (e.g., within a sub-macro second) of an incoming RTT packet.

In some embodiments, the reflector 104 may be configured to measure the fractional timing error at the current timeslot $t_i$. In some embodiments, the reflector 104 may be configured to include the internal Tx-Rx path time delay variation into the fractional error. In some embodiments, the reflector 104 may be configured to use the RTT loopback to measure the internal Tx-Rx path time delay variation. In some embodiments, some or all portions of the loopback may be a digital across clock domain loopback and/or an analog loopback. In some embodiments, the total delay (e.g., fractional error and loopback delay) may include one or more of the following components: an integer number of clock cycles; or a fractional part of clock cycles. In some embodiments, in inline time transfer using loopback measurements, at the current timeslot $t_i$, the reflector may be configured to re-adjust the transmitted signal delay (ToD) for an outgoing RTT packet based on the desired time offset.

Figure 7:
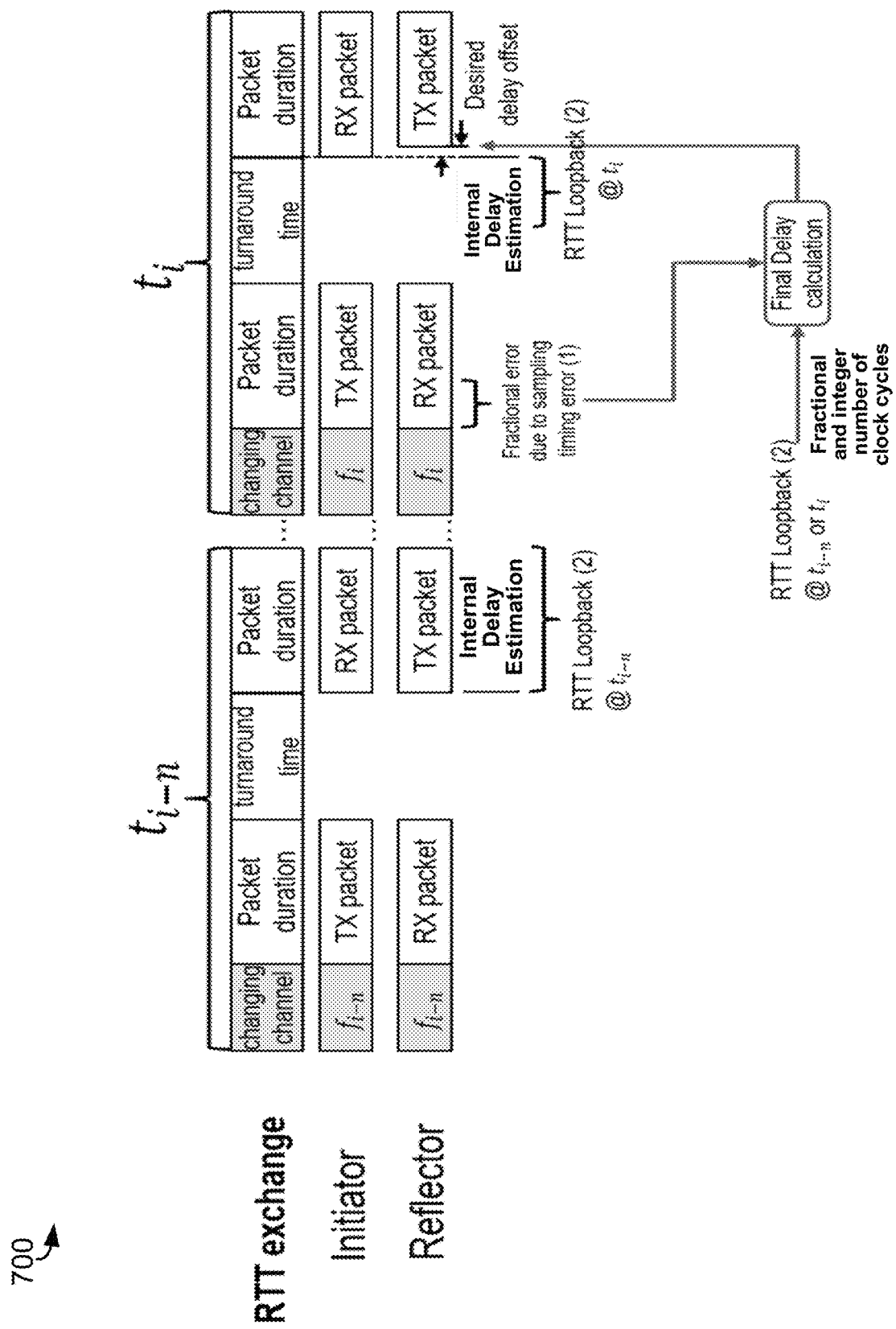
FIG. 7 illustrates an example timing diagram for measuring one or more timing components (e.g., a fractional error component and/or a time delay variation component) to adjust a transmitted signal delay, according to some embodiments.

FIG. 7 illustrates an example timing diagram for measuring one or more timing components (e.g., a fractional error component and/or a time delay variation component) to adjust a transmitted signal delay, according to some embodiments. The timing diagram 700 shows the exchange of RTT packets between an initiator 102 and reflector 104 during a previous timeslot $t_{i-n}$ and a current timeslot $t_i$, and the corresponding changing channel, RTT packet duration, and turnaround time.

As shown, the desired time offset may include a fractional error component and/or a time delay variation component. In some embodiments, a fractional error component may be defined as the fractional error due to the delta (e.g., difference, dissimilarity, variation) between the RX sampling timing and received symbol timing. In some embodiments, a time delay variation component may be defined as the internal Rx-Tx path time delay variation measured by loopback based on an incoming RTT packet from the current timeslot $t_i$ or from any of the previous timeslots $t_{i-n}$ (e.g., historical timeslots) with respect to the current timeslot $t_i$.

Figure 8:
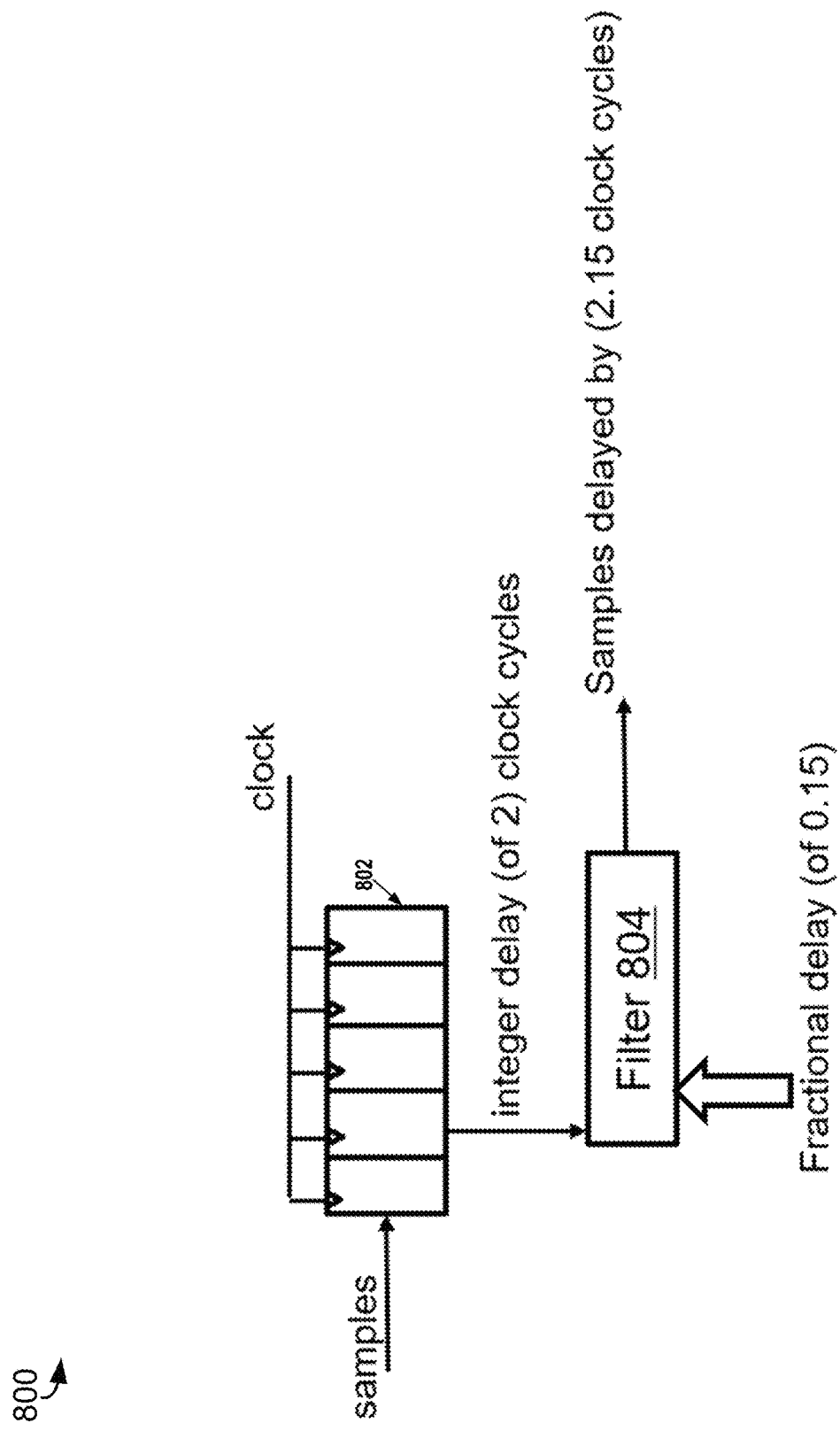
FIG. 8 illustrates a block diagram of an example inline time transfer, according to some embodiments.

FIG. 8 illustrates a block diagram of an example inline time transfer, according to some embodiments. As shown, the block diagram 800 includes a FIFO 802 that is coupled to a filter 804. In some embodiments, the filter 804 may be a Farrow-type filter.

In inline time transfer, the reflector may be configured to re-adjust the transmitted signal delay (ToD) based on the calculated time-offset using one or more timing components (e.g., a fractional error component and/or a time delay variation component). In some embodiments, the time-offset contribution from the one or more timing components may have integer or fractional delays; thus, the total time-offset will have two components: the integer and fractional delay. In some embodiments, the integer delays (e.g., multiple integer of clock cycles) may be implemented by a delay line of the FIFO 802. In some embodiments, the fractional delays (e.g., fraction of clock cycles) may be implemented by the filter 804. In some embodiments, the fractional delays (e.g., fraction of clock cycles) may be implemented by the filter 804, where the filter 804 is a Farrow type filter.

3. Hybrid Model Procedure Using Loopback Measurements

An initiator (e.g., initiator 102 in FIG. 1) may have an improved accuracy in measuring distance to a reflector (e.g., reflector 104 in FIG. 1) when the initiator 102 and/or the reflector 104 perform a hybrid procedure using loopback measurements. The hybrid model procedure may include any of the operations, features, and/or functionality of the inline phase transfer (e.g., according to the pre-rotation during estimation procedure and/or the post-rotation during generation procedure) and the inline time transfer. By performing the hybrid model procedure using loopback measurements, the initiator and/or reflector may be able to omit (e.g., skip, eliminate) the operation/step of sharing their respective secure phase measurement results (e.g., phase reports, timing reports) with one another; thereby resulting in less transmissions between the computing devices, which in turn, reduces power consumption and/or network congestion.

Figure 9:
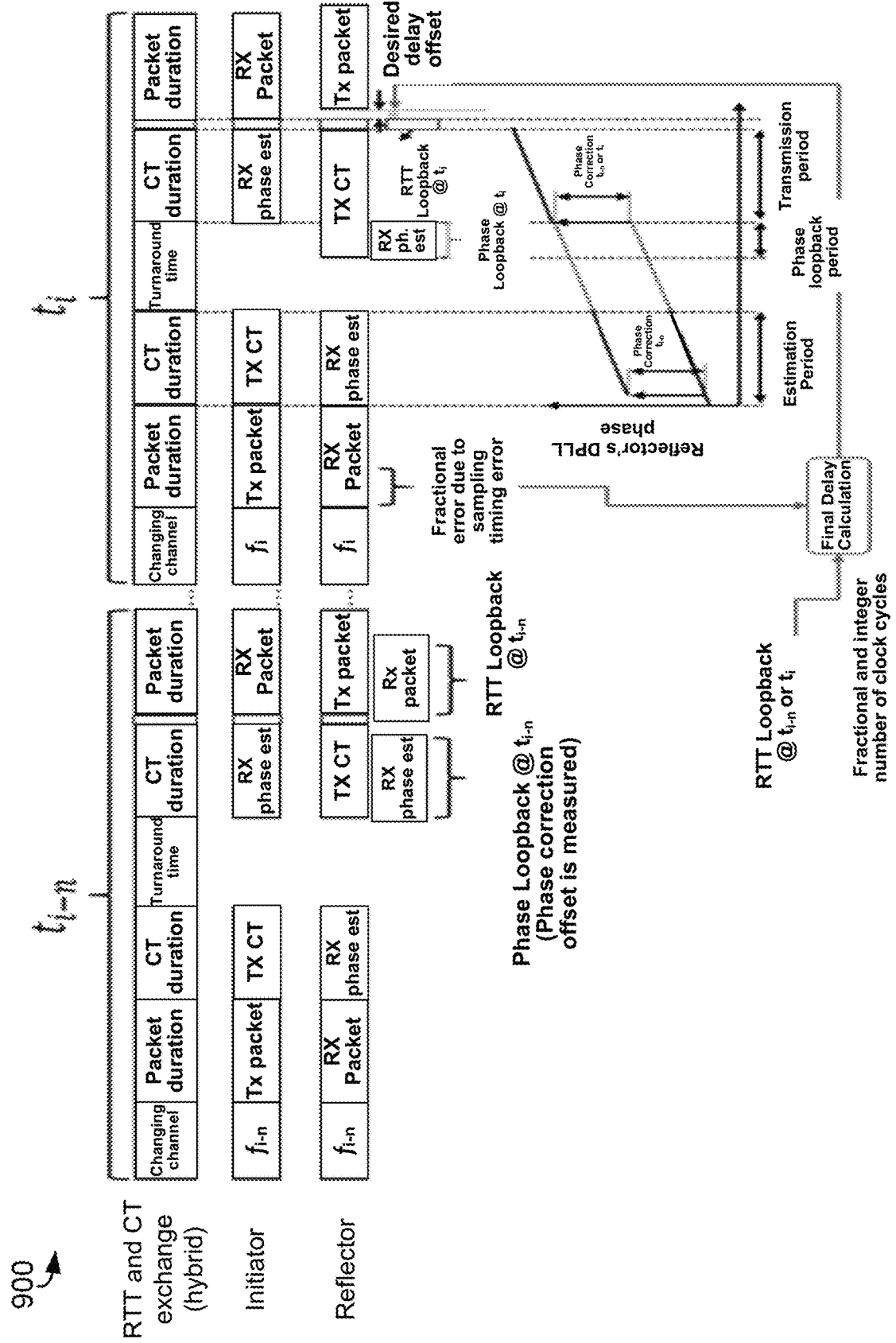
FIG. 9 illustrates a timing diagram of an example inline time transfer calculating the time offset based the inline phase transfer of the pre-rotation during estimation procedure and the inline phase transfer of the post-rotation during generation procedure, according to some embodiments.

FIG. 9 illustrates a timing diagram of an example inline time transfer calculating the time offset based the inline phase transfer of the pre-rotation during estimation procedure and the inline phase transfer of the post-rotation during generation procedure, according to some embodiments. The timing diagram 900 shows the exchange of RTT packets between an initiator 102 and reflector 104 during a previous timeslot $t_{i-n}$ and a current timeslot $t_i$, and the corresponding changing channel, RTT packet duration, CT duration, and turnaround time.

In some embodiments, the incoming CT signals and/or incoming RTT packets may be scheduled to be transmitted and/or received at the same timeslot. In some embodiments, the reflector 104 may be configured to perform both inline phase transfer and inline time transfer at the same timeslot. In some embodiments, the reflector 104, at the current timeslot $t_i$, may perform the inline phase transfer according to the operations of the pre-rotation during estimation procedure (as discussed herein) or the post-rotation during generation procedure (as discussed herein). In some embodiments, the reflector 104 may be configured to calculate the desired phase rotation offset using the loopback measurements (e.g., phase and/or frequency) based on the incoming CT signal from the current timeslot $t_i$ or any of the previous timeslots $t_{i-n}$ (e.g., historical timeslots) with respect to the current timeslot $t_i$.

4. Measuring Internal Rx-Tx Path Phase Rotation and Time Delay Variation

Figure 10:
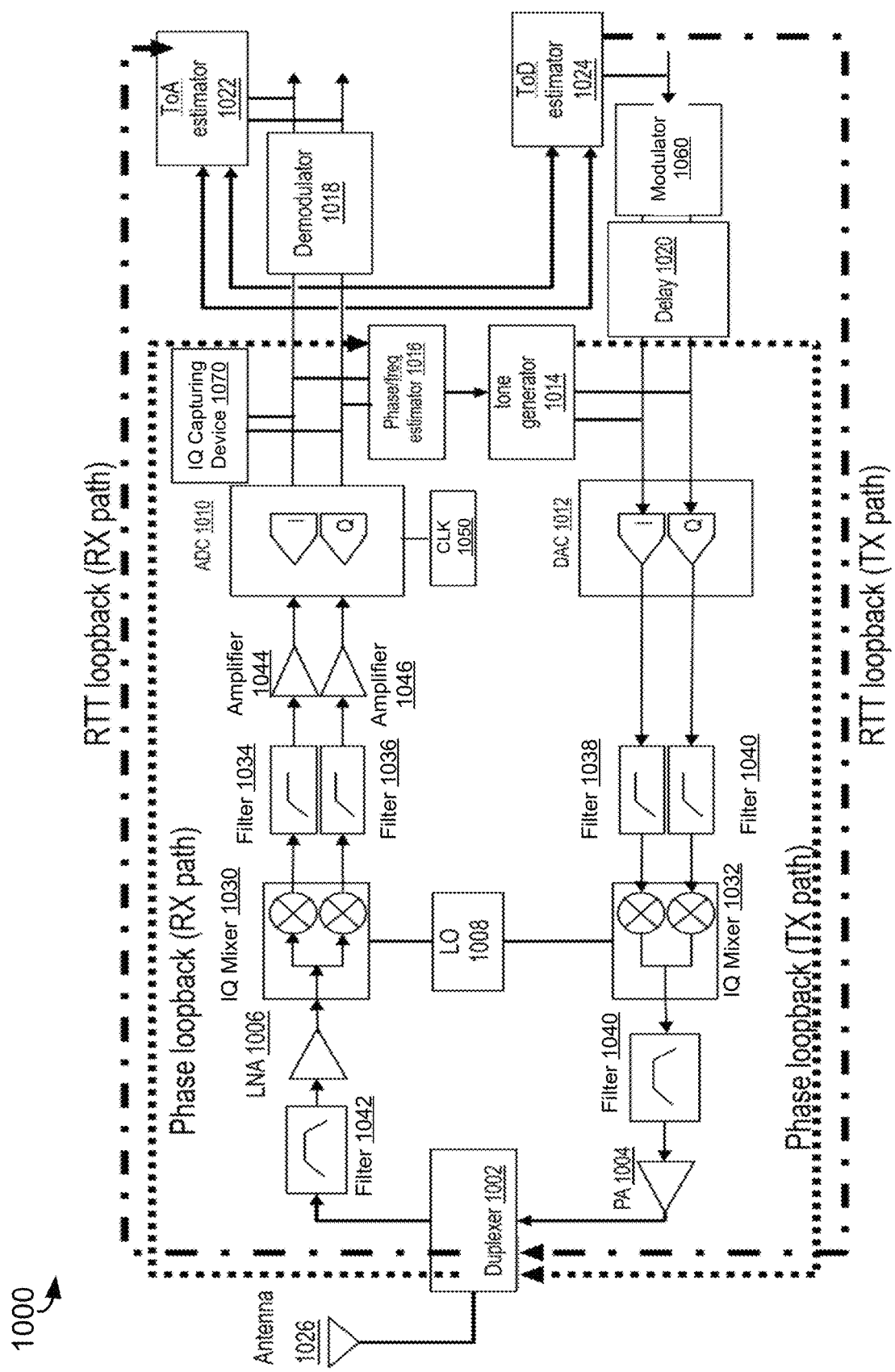
FIG. 10 illustrates a block diagram of an example architecture using a phase loopback and an Round-Trip Time (RTT) loopback, where the time measurement reports (e.g., ToD-ToA) and/or phase measurement reports, according to some embodiments.

FIG. 10 illustrates a block diagram of an example architecture using a phase loopback and an RTT loopback, where the time measurement reports (e.g., ToD-ToA) and/or phase measurement reports, according to some embodiments. The architecture 1000 may be a computing device, such as an initiator 102 in FIG. 1 and/or a reflector 104 in FIG. 1. As shown, the architecture 1000 includes an antenna 1026 coupled to a first input terminal of a duplexer 1002, whose first output terminal is coupled to an input terminal of a filter 1042 and an output terminal of a power amplifier (shown in FIG. 10, as "PA 1004"). An output terminal of the filter 1042 is coupled to an input terminal of a low-noise amplifier (shown in FIG. 9 as, "LNA 1006"), whose output is coupled to a first input terminal of an in-phase quadrature (IQ) mixer 1030. A second input terminal of the IQ mixer 1030 is coupled to a first output terminal of a local oscillator (shown in FIG. 9 as, "LO 1008"). A first output terminal of the IQ mixer 1030 is coupled to an input terminal of a filter 1034, whose output terminal is coupled to an input terminal of an amplifier 1044, whose output terminal is coupled to a first input terminal of an analog-to-digital converter (shown in FIG. 10 as, "ADC 1010").

A second output terminal of the IQ mixer 1030 is coupled to an input terminal of a filter 1036, whose output terminal is coupled to an input terminal of an amplifier 1046, whose output terminal is coupled to a second input terminal of the ADC 1010. A third input terminal of the ADC 1010 is coupled to a clock source (shown in FIG. 10, as "CLK 1050").

A first output terminal of the ADC 1010 is coupled to a first terminal of an IQ capturing device 1070 (e.g., configured to perform IQ capturing over incoming CT signals), a first input terminal of a phase/frequency estimator 1016, a first input terminal of a demodulator 1018, a first input terminal of a Time-of-Arrival estimator (shown in FIG. 10, as, "ToA estimator 1022), and a first input terminal of a Time-of-Departure estimator (shown in FIG. 10, as, "ToD estimator 1024"). In some embodiments, the demodulator 1018 is configured to support one or more modulation types, including Gaussian frequency shift keying (GFSK), differential quadrature phase shift keying (DQPSK), and 8DPSK modulation.

A second output terminal of the ADC 1010 is coupled to a second terminal of the IQ capturing device 1070, a second input terminal of the phase/frequency estimator 1016, a second input terminal of the demodulator 1018, a first input terminal of the ToA estimator 1022, and a first input terminal of the ToD estimator 1024.

A first output terminal of the demodulator 1018 is coupled to a third input terminal of the ToA estimator 1022. A second output terminal of the demodulator 1018 is coupled to a fourth input terminal of the ToA estimator 1022.

A third input terminal of the ToD estimator 1024 is coupled to an input terminal of a modulator 1060. In some embodiments, the modulator 1060 is configured to support one or more modulation types, including GFSK, DQPSK, or 8DPSK modulation. A first output terminal of the modulator 1060 is coupled to a first input terminal of a delay 1020 and a second output terminal of the modulator 1060 is coupled to a second input terminal of the delay 1020. A first output terminal of the delay 1020 is coupled to a first output terminal of a tone generator 1014 and a first input terminal of a digital to analog converter (shown in FIG. 10, as "DAC 1012"), whose first output terminal is coupled to an input terminal of a filter 1038, whose output terminal is coupled to a first input terminal of an IQ mixer 1032.

A second output terminal of the modulator 1060 is coupled to a second input terminal of the delay 1020 and a second output terminal of the modulator 1060 is coupled to a second input terminal of the delay 1020. A second output terminal of the delay 1020 is coupled to a second output terminal of the tone generator 1014 and a second input terminal of the DAC 1012, whose second output terminal is coupled to an input terminal of a filter 1040, whose output terminal is coupled to a second input terminal of the IQ mixer 1032.

A first output terminal of the IQ mixer 1032 is coupled to a second output terminal of the LO 1008. A second output terminal of the IQ mixer 1032 is coupled to an input terminal of a filter 1040, whose output terminal is coupled to an input terminal of the PA 1004.

A third output terminal of the tone generator 1014 is coupled, via a Tx loopback path (shown in FIG. 10 as, "Phase loopback (Tx path)"), to the antenna 1026, a second input terminal of the duplexer 1002, and/or a third input terminal of the phase/frequency estimator 1016. In some embodiments, the Tx loopback path is coupled between the antenna 1026 and the third input terminal of the phase/frequency estimator 1016.

An output terminal of the ToD estimator 1024 is coupled, via an Rx loopback path (shown in FIG. 10 as, "RTT loopback (Tx path)"), to the antenna 1026, to a third input terminal of the duplexer 1002, and/or a third input terminal of the ToA estimator 1022. In some embodiments, the Rx loopback path is coupled between the antenna 1026 and the third input terminal of the ToA estimator 1022.

Still referring to FIG. 10, in some embodiments, the phase-based ranging and RTT procedures (as discussed herein) may need an antenna (e.g., antenna 1026) of a computing device (e.g., initiator 102, reflector 104) to be the reference point for the phase measurement, Time-of-Departure (ToD) and Time-of-Arrival (ToA) estimations. As a response, in some embodiments, the reflector 104 may require to measure and to compensate (e.g., offset, correct, equalize) for any additional internal phase rotations and/or time delays.

Therefore, as discussed herein regarding the phase-based ranging techniques of the present disclosure, the reflector 104 may be configured to enable the loopback (e.g., Tx loopback path and/or Rx loopback path) to compensate and to measure the internal phase rotation and time delay variation (sub-macro second). In phase-loopback, the reflector 104 may be configured to enable the Tx RF and modem path, while transmitting the CT signal. In some embodiments, the reflector 104 may be configured to measure the phase rotation from the tone generator 1014 to the RF port (e.g., at antenna 1026) and back toward the modem RX path. In some embodiments, the measured phase rotation may be used as a desired phase offset correction to re-adjust the phase of tone generator for the inline phase transfer according to the operations of the pre-rotation during estimation procedure (as discussed herein) or the post-rotation during generation procedure (as discussed herein).

In some embodiments, the reflector 104 may be configured to enable the loopback (e.g., Tx loopback path and/or Rx loopback path) to compensate and to measure the internal time delay (and to measure the new variation) for RTT measurement. In some embodiments, in RTT-loopback, the reflector 104 may be configured to enable the Tx RF and modem path, while transmitting the RTT packet. In some embodiments, the reflector 104 may be configured to measure the time delay variation from a medium access control (MAC) of the architecture 1000 to the RF port and back toward the modem RX path. In some embodiments, the reflector 104 may be configured to use the measured time delay variation as a desired fractional delay offset variation to re-adjust the ToD of transmitted RTT packet. In some embodiments, the ToD estimator 1024 and/or the ToA estimator 1022 may each be configured to use the IQs sample or demodulated information to estimate the Time-of-Arrival (ToA) and/or Time-of-Departure (ToD).

Figure 11:
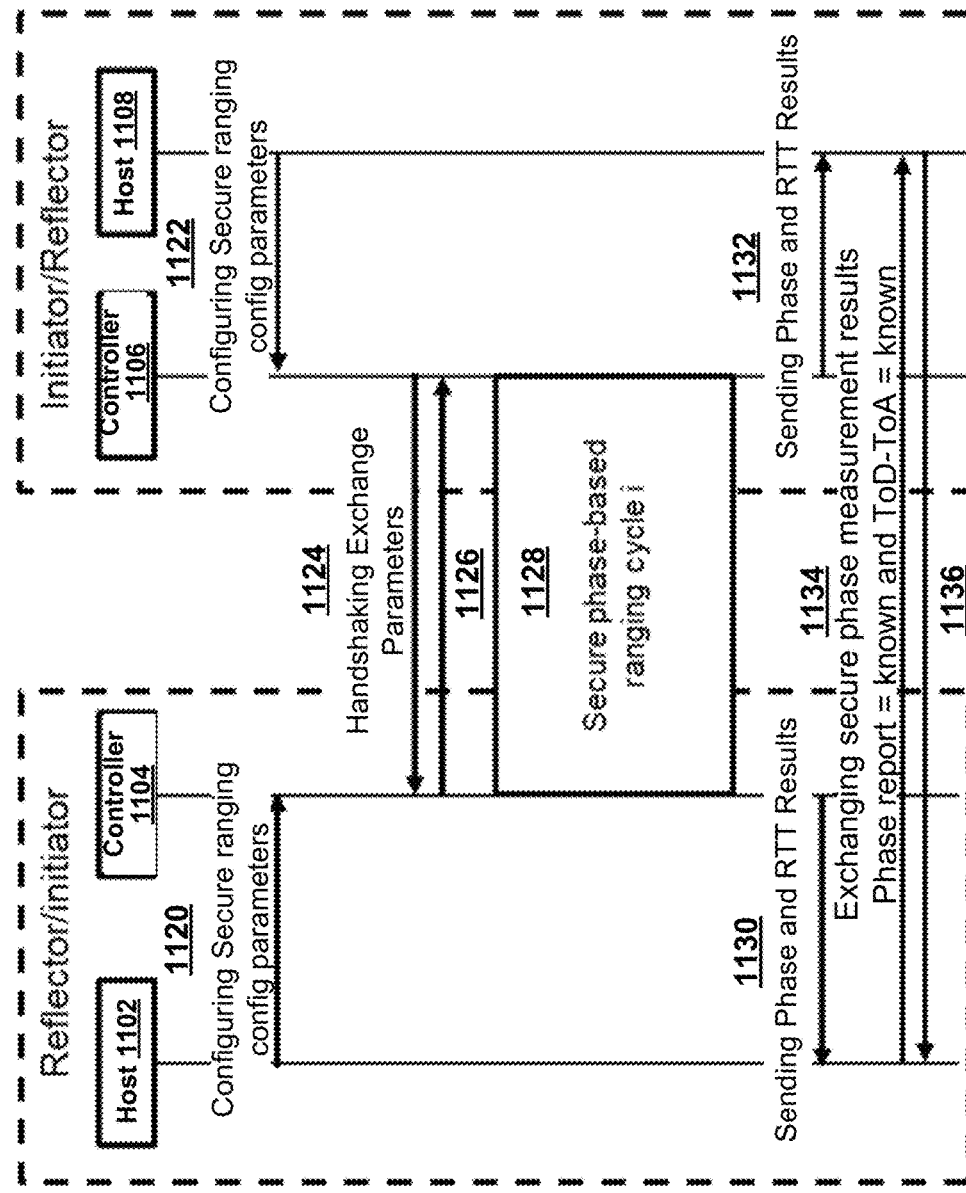
FIG. 11 is a flow diagram of a message sequence for an inline time transfer and an inline phase transfer using loopback, according to some embodiments.

FIG. 11 is a flow diagram of a message sequence for an inline time transfer and an inline phase transfer using loopback, according to some embodiments. In some embodiments, the time measurement reports (e.g., ToD-ToA) and/or phase measurement reports are set as known values.

As shown, an initiator 102 may include a host 1102 and/or a controller 1104. A reflector 104 may include a host 1108 and/or a controller 1106.

The method 1100, in some embodiments, may include the operation 1120 of the host 1102 sending a message to the controller 1104 that indicates (or includes) configuring secure ranging configuration parameters. The method 1100, in some embodiments, may include the operation 1122 of the host 1108 sending a message to the controller 1106 that indicates (or includes) configuring secure ranging configuration parameters.

The method 1100, in some embodiments, may include the operation 1124 of the controller 1106 sending a message to the controller 1104 that indicates (or includes) handshaking parameters. The method 1100, in some embodiments, may include the operation 1126 of the controller 1104 sending a message to the controller 1106 that indicates (or includes) handshaking parameters.

The method 1100, in some embodiments, may include the operation 1128 of the controller 1104 and/or the controller 1106 performing a secure phase-based ranging cycle with each other, according to the timing diagram 100 of FIG. 1.

The method 1100, in some embodiments, may include the operation 1130 of the controller 1104 sending a message to the host 1102 that indicates (or includes) phase, frequency, and/or RTT results. The method 1100, in some embodiments, may include the operation 1132 of the controller 1106 sending a message to the host 1108 that indicates (or includes) phase, frequency, and/or RTT results.

The method 1100, in some embodiments, may include the operation 1134 of the host 1102 sending a message to the host 1108 that indicates (or includes) one or more secure phase measurement results. The method 1100, in some embodiments, may include the operation 1136 of the host 1108 sending a message to the host 1102 that indicates (or includes) one or more secure phase measurement results. In some embodiments, a secure phase measurement report may include phase report (e.g., phase and/or frequency) and/or a timing report (e.g., ToD-ToA measurements).

In some embodiments, the initiator 102 and/or reflector 104 may perform operation 1128 according to the inline phase transfer procedure (as discussed herein), the inline time transfer procedure (as discussed herein), or the hybrid model procedure (as discussed herein); thereby allowing the initiator 102 and/or reflector 104 to omit one of more of operations 1130-1136.

FIG. 12 is a flow diagram of a method of an efficient secure phase-based ranging using loopback calibration, according to some embodiments. Although the operations are depicted in FIG. 12 as integral operations in a particular order for purposes of illustration, in other implementations, one or more operations, or portions thereof, are performed in a different order, or overlapping in time, in series or parallel, or are omitted, or one or more additional operations are added, or the method is changed in some combination of ways. In some embodiments, the method 1200 may be performed by processing logic that comprises hardware (e.g., circuitry, dedicated logic, programmable logic, microcode, etc.), firmware, or a combination thereof. In some embodiments, some or all operations of method 1200 may be performed by processing logic included in the initiator 102 in FIG. 1. In some embodiments, some or all operations of method 1200 may be performed by processing logic included in the reflector 104 in FIG. 1. In some embodiments, some or all operations of method 1200 may be performed by processing logic included in the architecture 1000 in FIG. 10 and/or any component in the architecture in FIG. 10.

The method of 1200, in some embodiments, may include the operation 1202 of receiving, by a reflector during a current timeslot, an incoming constant tone (CT) signal having a phase shift. The method of 1200, in some embodiments, may include the operation 1204 of determining, by the reflector during the current timeslot or a previous timeslot, a phase shift correction value by using a receiver/transmitter (Rx/Tx) loopback path of the reflector. The method of 1200, in some embodiments, may include the operation 1206 of generating, by the reflector, an outgoing CT signal having an updated phase shift by adjusting the phase shift of the incoming CT signal based on the phase shift correction value.

Figure 13:
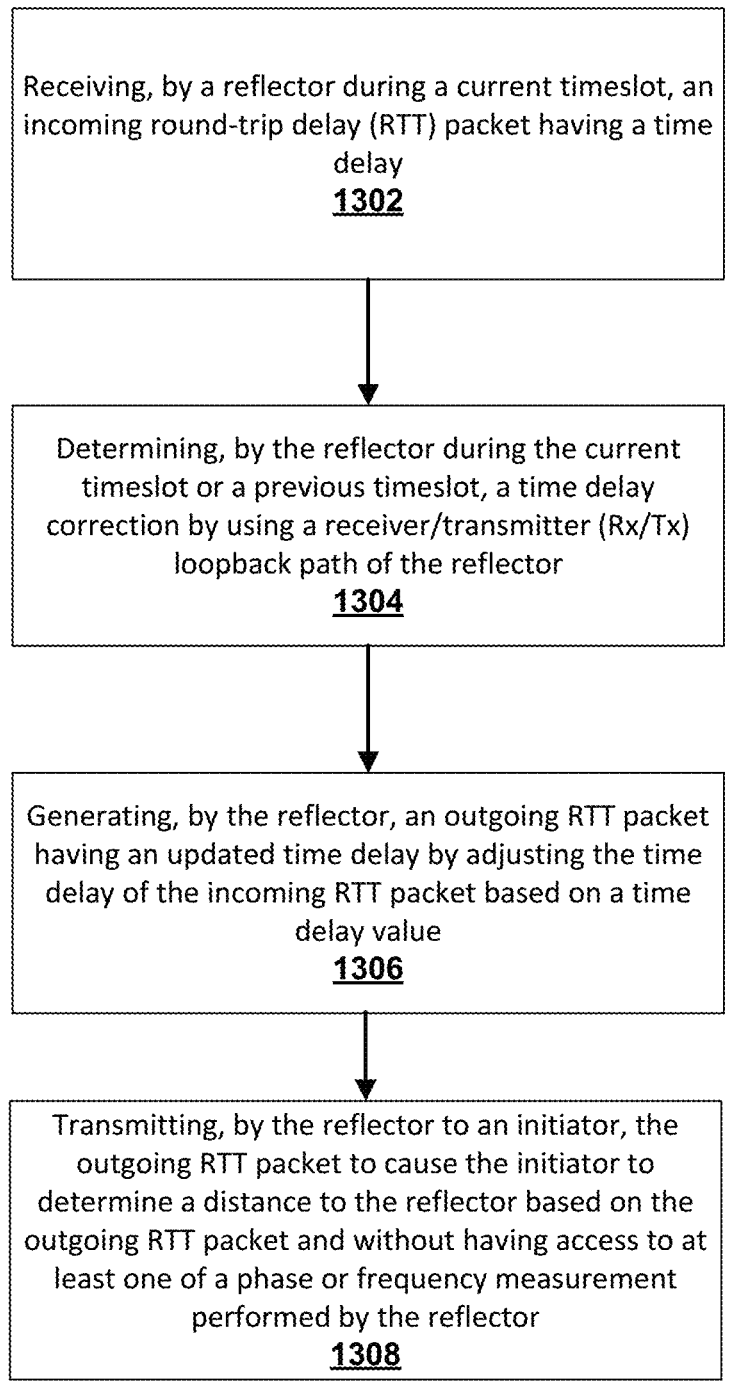
FIG. 13 is a flow diagram of a method of an efficient secure phase-based ranging using loopback calibration, according to some embodiments.

FIG. 13 is a flow diagram of a method of an efficient secure phase-based ranging using loopback calibration, according to some embodiments. Although the operations are depicted in FIG. 13 as integral operations in a particular order for purposes of illustration, in other implementations, one or more operations, or portions thereof, are performed in a different order, or overlapping in time, in series or parallel, or are omitted, or one or more additional operations are added, or the method is changed in some combination of ways. In some embodiments, the method 1300 may be performed by processing logic that comprises hardware (e.g., circuitry, dedicated logic, programmable logic, microcode, etc.), firmware, or a combination thereof. In some embodiments, some or all operations of method 1300 may be performed by processing logic included in the initiator 102 in FIG. 1. In some embodiments, some or all operations of method 1300 may be performed by processing logic included in the reflector 104 in FIG. 1. In some embodiments, some or all operations of method 1300 may be performed by processing logic included in the architecture 1000 in FIG. 10 and/or any component in the architecture in FIG. 10.

The method of 1300, in some embodiments, may include the operation 1302 of receiving, by a reflector during a current timeslot, an incoming round-trip delay (RTT) packet having a time delay. The method of 1300, in some embodiments, may include the operation 1304 of determining, by the reflector during the current timeslot or a previous timeslot, a time delay correction by using a receiver/transmitter (Rx/Tx) loopback path of the reflector. The method of 1300, in some embodiments, may include the operation 1306 of generating, by the reflector, an outgoing RTT packet having an updated time delay by adjusting the time delay of the incoming RTT packet based on a time delay value. The method of 1300, in some embodiments, may include the operation 1308 of Transmitting, by the reflector to an initiator, the outgoing RTT packet to cause the initiator to determine a distance to the reflector based on the outgoing RTT packet and without having access to at least one of a phase or frequency measurement performed by the reflector.

In the above description, some portions of the detailed description are presented in terms of algorithms and symbolic representations of operations on analog signals and/or digital signals or data bits within a non-transitory storage medium. These algorithmic descriptions and representations are the means used by those skilled in the data processing arts to most effectively convey the substance of their work to others skilled in the art. An algorithm is here and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers, or the like.

Reference in the description to "an embodiment," "one embodiment," "an example embodiment," "some embodiments," and "various embodiments" means that a particular feature, structure, step, operation, or characteristic described in connection with the embodiment(s) is included in at least one embodiment of the disclosure. Further, the appearances of the phrases "an embodiment," "one embodiment," "an example embodiment," "some embodiments," and "various embodiments" in various places in the description do not necessarily all refer to the same embodiment(s).

The description includes references to the accompanying drawings, which form a part of the detailed description. The drawings show illustrations in accordance with exemplary embodiments. These embodiments, which may also be referred to herein as "examples," are described in enough detail to enable those skilled in the art to practice the embodiments of the claimed subject matter described herein. The embodiments may be combined, other embodiments may be utilized, or structural, logical, and electrical changes may be made without departing from the scope and spirit of the claimed subject matter. It should be understood that the embodiments described herein are not intended to limit the scope of the subject matter but rather to enable one skilled in the art to practice, make, and/or use the subject matter.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "receiving," "communicating," "modifying," "measuring," "determining," "detecting," "sending," "comparing," "maintaining," "switching," "controlling," "generating," or the like, refer to the actions and processes of an integrated circuit (IC) controller, or similar electronic device, that manipulates and transforms data represented as physical (e.g., electronic) quantities within the controller's registers and memories into other data similarly represented as physical quantities within the controller memories or registers or other such information non-transitory storage medium.

The words "example" or "exemplary" are used herein to mean serving as an example, instance, or illustration. Any aspect or design described herein as "example' or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an embodiment" or "one embodiment" throughout is not intended to mean the same embodiment or embodiment unless described as such.

Embodiments described herein may also relate to an apparatus (e.g., such as an AC-DC converter, and/or an ESD protection system/circuit) for performing the operations herein. This apparatus may be specially constructed for the required purposes, or it may comprise firmware or hardware logic selectively activated or reconfigured by the apparatus. Such firmware may be stored in a non-transitory computer-readable storage medium, such as, but not limited to, read-only memories (ROMs), random access memories (RAMs), EPROMs, EEPROMs, flash memory, or any type of media suitable for storing electronic instructions. The term "computer-readable storage medium" should be taken to include a single medium or multiple media that store one or more sets of instructions. The term "computer-readable medium" shall also be taken to include any medium that is capable of storing, encoding, or carrying a set of instructions for execution by the machine and that causes the machine to perform any one or more of the methodologies of the present embodiments. The term "computer-readable storage medium" shall accordingly be taken to include, but not be limited to, solid-state memories, optical media, magnetic media, any medium that is capable of storing a set of instructions for execution by the machine and that causes the machine to perform any one or more of the methodologies of the present embodiments.

The above description sets forth numerous specific details such as examples of specific systems, components, methods, and so forth, in order to provide a good understanding of several embodiments of the present disclosure. It is to be understood that the above description is intended to be illustrative and not restrictive. Many other embodiments will be apparent to those of skill in the art upon reading and understanding the above description. The scope of the disclosure should, therefore, be determined with reference to the appended claims, along with the full scope of equivalents to which such claims are entitled.

What is claimed is:

1. A method, comprising:
   receiving, by a reflector during a current timeslot, an incoming constant tone (CT) signal having a phase shift;
   determining, by the reflector during the current timeslot or a previous timeslot, a phase shift correction value by using a receiver/transmitter (Rx/Tx) loopback path of the reflector; and
   generating, by the reflector, an outgoing CT signal having an updated phase shift by adjusting the phase shift of the incoming CT signal based on the phase shift correction value.

2. The method of claim 1, wherein the correction value is associated with a phase rotation of a signal that travels along the Rx/Tx loopback path of the reflector.

3. The method of claim 1, further comprising:
   rotating, by the reflector, a phase of the incoming CT signal based on the correction value to generate a rotated signal having the updated phase shift; and
   performing, by the reflector, at least one of a phase or frequency measurement on the rotated signal.

4. The method of claim 3, further comprising:
   locking, by the reflector, a phase of a tone generator based on the at least one of the phase or frequency measurement of the rotated signal.

5. The method of claim 3, further comprising:
   transmitting, by the reflector to an initiator, the outgoing CT signal to cause the initiator to determine a distance to the reflector based on the outgoing CT signal and without having access to the at least one of the phase or frequency measurement of the rotated signal.

6. The method of claim 1, wherein the previous timeslot is before a second previous timeslot, wherein the second previous timeslot immediately precedes the current timeslot.

7. The method of claim 1, further comprising:
   performing, by the reflector, at least one of a phase or frequency measurement on the incoming CT signal.

8. The method of claim 7, further comprising:
   locking a phase of a tone generator based on the at least one of the phase or frequency measurement of the incoming CT signal to generate a CT signal by; and
   rotating, by the reflector, a phase of the CT signal based on the correction value to generate the outgoing CT signal having the updated phase shift.

9. The method of claim 8, further comprising:
   transmitting, by the reflector to an initiator, the outgoing CT signal to cause the initiator to determine a distance to the reflector based on the outgoing CT signal, wherein the outgoing signal does not include the phase or frequency measurement of the incoming CT signal.

10. The method of claim 1, further comprising:
    determining, by the reflector during the current timeslot or the previous timeslot, a time delay correction by using the receiver/transmitter (Rx/Tx) loopback path of the reflector, the time delay indicative of a delta between a sampling timing of the receiver of the reflector and a symbol timing received by the receiver of the reflector; and
    generating, by the reflector, an outgoing RTT packet having an updated time delay by adjusting the time delay of an incoming RTT packet based on the time delay value.

11. An integrated circuit, comprising:
    a rotator;
    a tone generator;
    an estimator coupled between the rotator and the tone generator; and
    a receiver/transmitter (Rx/Tx) loopback path coupled between the tone generator and the estimator;
    wherein the rotator is configured to:
       receive, during a current timeslot, an incoming constant tone (CT) signal having a phase shift; and
       generate an outgoing CT signal having an updated phase shift by adjusting the phase shift of the incoming CT signal based on a phase correction value; and
    wherein the estimator is configured to determine the phase shift correction by using the receiver/transmitter (Rx/Tx) loopback path of the integrated circuit.

12. The integrated circuit of claim 11, wherein the correction value is associated with a phase rotation of a signal that travels along the Rx/Tx loopback path of a reflector.

13. The integrated circuit of claim 11, wherein the rotator is further configured to
rotate a phase of the incoming CT signal based on the correction value to generate a rotated signal having the updated phase shift, and wherein the estimator is further configured to perform at least one of a phase or frequency measurement on the rotated signal.

14. The integrated circuit of claim 13,
wherein the tone generator is configured to:
lock a phase of the tone generator based on the at least one of the phase or frequency measurement of the rotated signal.

15. The integrated circuit of claim 13,
wherein the tone generator is further configured to:
transmit, to an initiator, the outgoing CT signal to cause the initiator to determine a distance to a reflector based on the outgoing CT signal, wherein the outgoing signal does not include the phase or frequency measurement of the rotated signal.

16. The integrated circuit of claim 11, wherein a previous timeslot is before a second previous timeslot, the second previous timeslot immediately precedes the current timeslot.

17. The integrated circuit of claim 11,
wherein the estimator is further configured to:
perform at least one of a phase or frequency measurement on the incoming CT signal.

18. The integrated circuit of claim 17,
wherein the tone generator is configured to:
lock a phase of a tone generator based on the at least one of the phase or frequency measurement of the incoming CT signal to generate a CT signal; and
wherein the rotator is further configured to:
rotate a phase of the CT signal based on the correction value to generate the outgoing CT signal having the updated phase shift.

19. The integrated circuit of claim 18,
wherein the tone generator is configured to:
transmit, to an initiator, the outgoing CT signal to cause the initiator to determine a distance to a reflector based on the outgoing CT signal, wherein the outgoing signal does not include the phase or frequency measurement of the incoming CT signal.

20. A method, comprising:
receiving, by a reflector during a current timeslot, an incoming round-trip delay (RTT) packet having a time delay;
determining, by the reflector during the current timeslot or a previous timeslot, a time delay correction by using a receiver/transmitter (Rx/Tx) loopback path of the reflector;
generating, by the reflector, an outgoing RTT packet having an updated time delay by adjusting the time delay of the incoming RTT packet based on a time delay value; and
transmitting, by the reflector to an initiator, the outgoing RTT packet to cause the initiator to determine a distance to the reflector based on the outgoing RTT packet and without having access to at least one of a phase or frequency measurement performed by the reflector.

* * * * *